United States Patent [19]

Okano et al.

[11] Patent Number: 5,295,126
[45] Date of Patent: Mar. 15, 1994

[54] INFORMATION RECORDING APPARATUS FOR RECORDABLE OPTICAL DISC

[75] Inventors: Makoto Okano; Shuichi Yanagisawa, both of Tsurugashima, Japan

[73] Assignee: Pioneer Electronic Corporation, Tokyo, Japan

[21] Appl. No.: 985,125

[22] Filed: Dec. 3, 1992

[30] Foreign Application Priority Data

Dec. 17, 1991 [JP] Japan ................................. 3-333706

[51] Int. Cl.[5] ................................. G11B 7/00
[52] U.S. Cl. ................................. 369/47; 360/71;
369/48; 369/50; 369/84; 369/95
[58] Field of Search ............. 369/13, 32, 47–50,
369/54, 58, 83–84, 93, 95, 110, 111, 124;
360/14.1, 14.2, 14.3, 15, 27, 70, 71, 72.1;
358/342

[56] References Cited

U.S. PATENT DOCUMENTS

| 4,873,679 | 10/1989 | Murai et al. ................. 369/32 |
| 4,916,685 | 4/1990 | Endoh et al. ................. 369/47 |
| 5,111,442 | 5/1992 | Nakajima et al. ................. 369/47 |
| 5,237,553 | 8/1993 | Fukushima et al. ................. 369/47 X |

Primary Examiner—W. R. Young
Attorney, Agent, or Firm—Sughrue, Mion, Zinn, Macpeak & Seas

[57] ABSTRACT

An information recording apparatus for receiving recording information and index information with respect to the recording information, and recording the recording information on a recordable disc medium, including memory device for storing the index information as first index information, first recording device for recording the recording information on the disc recording medium in accordance with the first index information, control device for producing second index information on the basis of the first information, and second recording device for recording the second index information on the disc recording medium in parallel with the recording by the first recording device.

8 Claims, 5 Drawing Sheets

FIG. 2

| RECORDING SEQUENCE TABLE | | |
|---|---|---|
| RECORDING SEQUENCE | TRACK | RECORDING TIME |
| # 1 | TRACK 5 | 5' 20" |
| 2 | TRACK 7 | 3' 10" |
| 3 | TRACK 2 | 2' 25" |
| 4 | TRACK 4 | 6' 30" |
| 5 | TRACK 9 | 4' 15" |
| 6 | (UNDECIDED) | (UNDECIDED) |
| 7 | ″ | ″ |
| ⋮ | ⋮ | ⋮ |

TOTAL: 21' 40" (sequences #1–5)

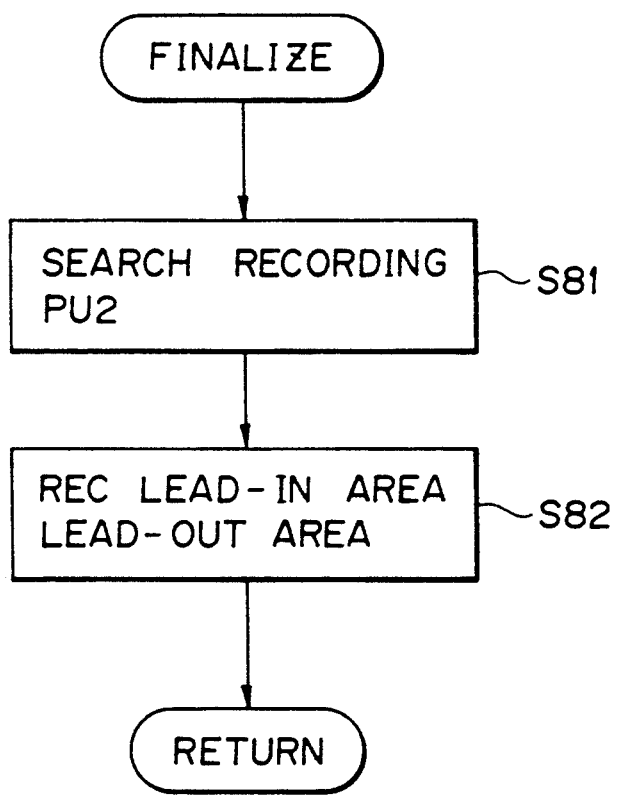

INFORMATION RECORDING APPARATUS FOR RECORDABLE OPTICAL DISC

BACKGROUND OF THE INVENTION

1. Field of the invention

The present invention generally relates to an information recording apparatus for recordable optical disc such as an R-CD (Recordable Compact Disc), and more particularly to an information recording apparatus which can reduce a time required to record information for making a completely recorded disc.

2. Description of the prior art

An optical disc called "CD (Compact Disc)" is generally known. The CD is provided with a lead-in area, a program area and a lead-out area from an inner circumference to an outer circumference of the disc. The lead-in area contains index information for recorded information, the program area contains actual recorded information, and the lead-out area indicates the end of the program area. The information is recorded as digital signals modulated by "EFM" (Eight to Fourteen Modulation), and the signals include main code (main information) such as music information and subcode such as a time code (time information), etc. The index information recorded in the lead-in area is called "TOC (Table Of Contents)" which includes a total number of recorded information pieces in the program area, e.g., a total number of music pieces, a total recorded time, e.g., a total playing time of the music pieces, and so on. On the program area, in addition to the music information or the like recorded as the main code, Q data of the subcode, track number (TNO) indicating the number of the recorded information piece such as music piece, recording time (P-TIME) counted from the start of the track, and total recording time (A-TIME) counted from the starting track (No.1 track). The lead-out area contains a lead-out code indicating the lead-out area.

The CD having such a format is a medium used only for playback. However, it is developed an R-CD (Recordable Compact Disk) which has the same recording format as CD and on which information can be additionally recorded. The recording format of the R-CD is standardized by the standard defined in so called "orange book". In the recording format of R-CD, there are provided a PCA (Power Calibration Area) and a PMA (Program Memory Area) positioned inner side of the lead-in area. The PCA is a test area used for test recording for calibrating the recording laser power, and the PMA is an area for storing recording history of information recorded on the program area.

The PCA includes a TA (Test Area) used for test recording and a CA (Count Area) for recording information indicating which area in the TA has been already used for test recording.

In the PMA, following three information are recorded. The first information is a start address, an end address, etc. of the information recorded in the program area and is recorded according to the same recording format as that of the TOC information in the lead-in area. The second information is a disc identification information (optional) which may be recorded as six digits of numerical information for identification of the disc. The third information is skip instruction for skipping playback of some tracks or some portions of tracks and skip cancel instruction for cancelling the skip instruction.

PMA is provided by following reason. In a recording of R-CD, TOC information can not be recorded on the lead-in area until an end (finalize) of the recording is instructed since information may be further recorded in remained unrecorded area of the program area of the disc. Accordingly, provisional TOC information are recorded in the PMA.

Therefore, the TOC information provisionally stored in the PMA and the lead-out code are recorded after a finalization of the recording is notified by a user or a controller in the R-CD recording apparatus. Thus, the finalized R-CD can be played back by a disc player exclusive for playback.

However, it takes time to record the TOC information previously recorded in the PMA and the lead-out code for finalizing the R-CD.

SUMMARY OF THE INVENTION

It is an object of the invention to provide an information recording apparatus which can reduce a time required to finalize the recording on a recordable optical disc such as R-CD.

According to one aspect of the present invention, there is provided an information recording apparatus for receiving recording information and index information with respect to the recording information, and recording the recording information on a recordable disc medium, including memory device for storing the index information as first index information, first recording device for recording the recording information on the disc recording medium in accordance with the first index information, control device for producing second index information on the basis of the first information, and second recording device for recording the second index information on the disc recording medium in parallel with the recording by the first recording device.

In accordance with this invention, the index information corresponding to recording information to be recorded are stored in the memory means, which stores the index information as first index information. The first recording device records the recording information on the disc recording medium. In parallel, the second recording device records second index information such as TOC information, etc. on the disc recording medium.

Accordingly, the recording time can be remarkably reduced since the recording information and the index information are recorded on the disc recording medium in parallel.

The nature, utility and further features of this invention will be more clearly apparent form the following detailed description with respect to preferred embodiments of the invention when read in conjunction with the accompanying drawings briefly described below.

BRIEF DESCRIPTION OF THE DRAWINGS

FIG. 2 shows an example of data stored in a recording sequence table.

FIG. 5 is a flow chart showing an operation of the finalize process.

DETAILED DESCRIPTION OF THE PREFERRED EMBODIMENT

A preferred embodiment of the present invention will now be described with reference to the accompanying drawings.

Figure 1:
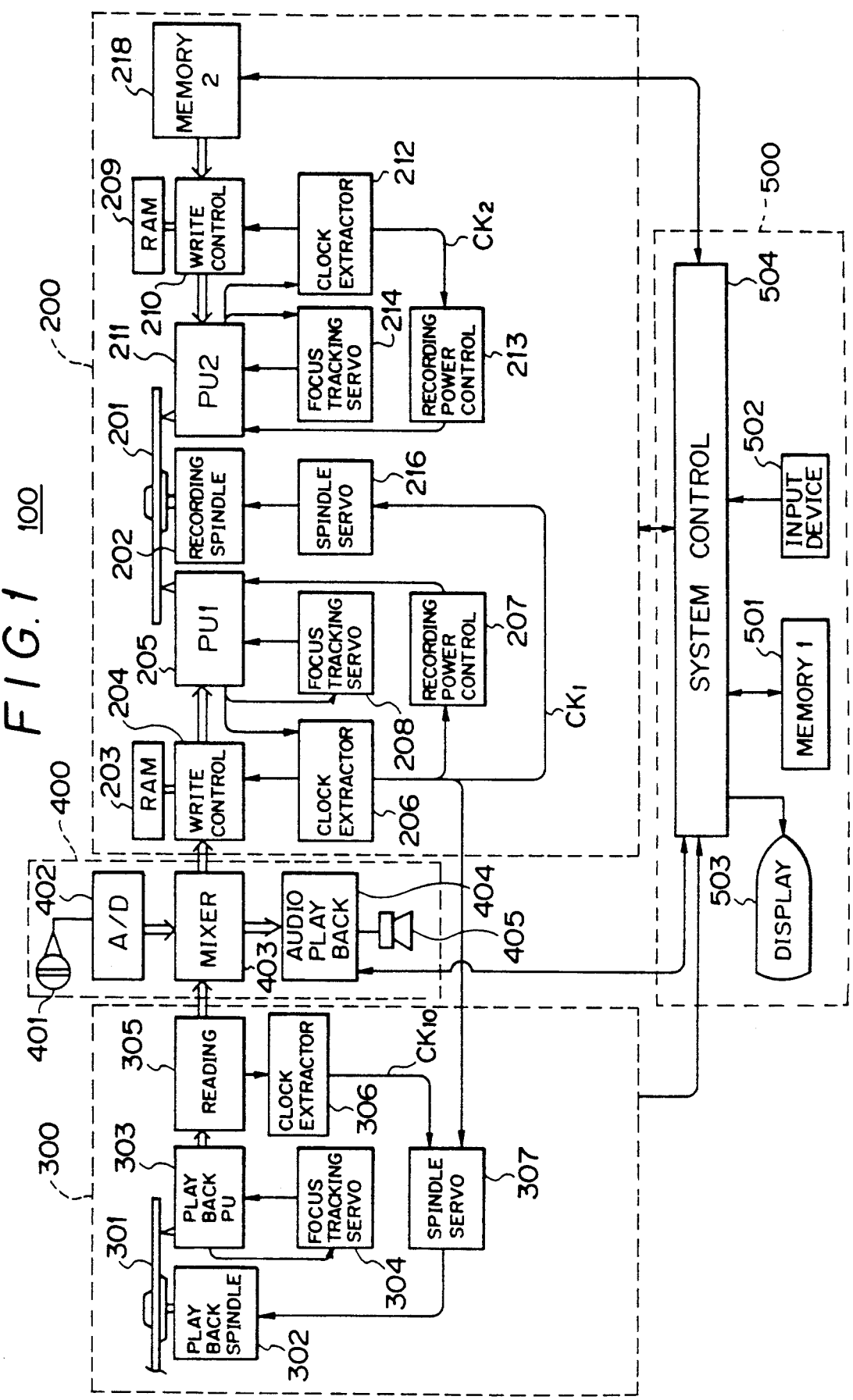
FIG. 1 is a block diagram showing a construction of an information recording apparatus according to an embodiment of the present invention.

FIG. 1 shows a construction of an information recording apparatus for so called "Karaoke" according to an embodiment of the present invention. The information recording apparatus roughly includes a recording block 200 for recording information on a R-CD 201, a playback block 300 for playing back a CD 301, a mixing block 400 for mixing a voice signal from outside with information output from the playback block 300 and converting them into an audio signal, and a system control block 500 for totally controlling operation of the information recording apparatus 100.

In the recording block 200, the R-CD 201 on which guide grooves (Pregroove) have been previously formed as write control signal is put on a turn table. The R-CD is rotated by a spindle motor 202 under the spindle servo control. The first write control unit 204 is connected to a first RAM 203 for temporarily storing recording data fed from the mixing block 400 and outputs the stored recording data to a first pick up 205. The first pick up 205 records the recording data fed from the first write control unit 204 on the R-CD 201. Simultaneously, the first pick up 205 reads the guide grooves on the R-CD 201 and outputs the read signal to a first clock extractor 206 and a first focus tracking servo 208. The first clock extractor 206 detects the wobbling frequency from the read signal output from the first pick up 205 and outputs a first clock signal $CK_1$ to a spindle servo unit 307, a first power control unit 207 and a spindle servo control unit 216. The first power control unit 207 controls a recording power of the first pick up 205 based on the first clock signal $CK_1$. The first focus tracking servo 208 detects a tracking error signal and a focus error signal from the read signal of the first pick up 205 and executes the tracking servo control and the focusing servo control of the first pickup 205. A second write control unit 210 is connected to a second RAM 209 for temporarily storing recording data output from a second memory 218 and outputs the stored recording data to a second pickup 211. The second pickup 211 records the recording data output from the second write control unit 210 on the R-CD 201. Simultaneously, the second pick up 211 reads the guide grooves and outputs a read signal to a second clock extractor 212 and a second focus tracking servo unit 214. The second clock extractor 212 detects the wobbling frequency from said read signal read by the second pick up 211 and outputs a second clock signal $CK_2$ to a second power control unit 213. The second power control unit 213 controls a recording power of the second pick up 211 based on the second clock signal $CK_2$. The second focus tracking servo unit 214 detects a tracking error signal and a focussing error signal from the read signal of the second pick up 211, and executes the tracking servo control and the focusing servo control of the second pick up 211. The spindle servo unit 216 outputs the spindle control signal to the spindle motor 202 on the basis of the clock signal $CK_1$.

In the playback block 300, the CD 301 on which recording data to be played back have been recorded is put on a turn table. The CD 301 is rotated by a playback spindle motor 302 based on the spindle servo control signal. A playback pickup 303 reads out data recorded on the CD 301 and outputs a read signal to a playback focus tracking servo unit 304, a reading unit 305 and a playback clock extractor 306 via the reading unit 305. The playback focus tracking servo unit 304 detects a tracking error signal and a focussing error signal from the signal read by the playback pick up 303, and executes the tracking servo control and the focus servo control of the playback pickup 303. The reading unit 305 produces recorded data from the read signal and outputs them to the first write control unit 204 in the recording block 200. The playback clock extractor 306 extracts a playback clock signal $CK_{10}$ from the read signal and outputs it to a playback spindle servo unit 307. The playback spindle servo unit 307 outputs the spindle servo control signal to the playback spindle motor 302 based on the playback clock signal $CK_{10}$.

The mixing block 400 includes a microphone 401 for converting an external voice signal into an electric signal, an A/D converter 402 for converting the electric signal from the microphone 401 into digital data, a mixer 403 for mixing the digital data output from the A/D converter 402 with playback data output from the reading unit 305 so as to produce mixed data. The mixed data is input to the first write control unit 204 as the recording data and to an audio playback unit 404 which decodes and amplifies the mixed data to output via a speaker 405.

The system control block 500 includes a system controller 504, a first memory 501 for storing a control information of recording, an input device 502 and a display 503 for indicating information to operators. The first memory 501 stores the control information including start track numbers, recording times (including pause time) of data recorded on the CD 301. The start track numbers and recording times of the music pieces to be recorded on the R-CD 201 are sequentially stored in the first memory 501 as shown in FIG. 2.

Figure 3:
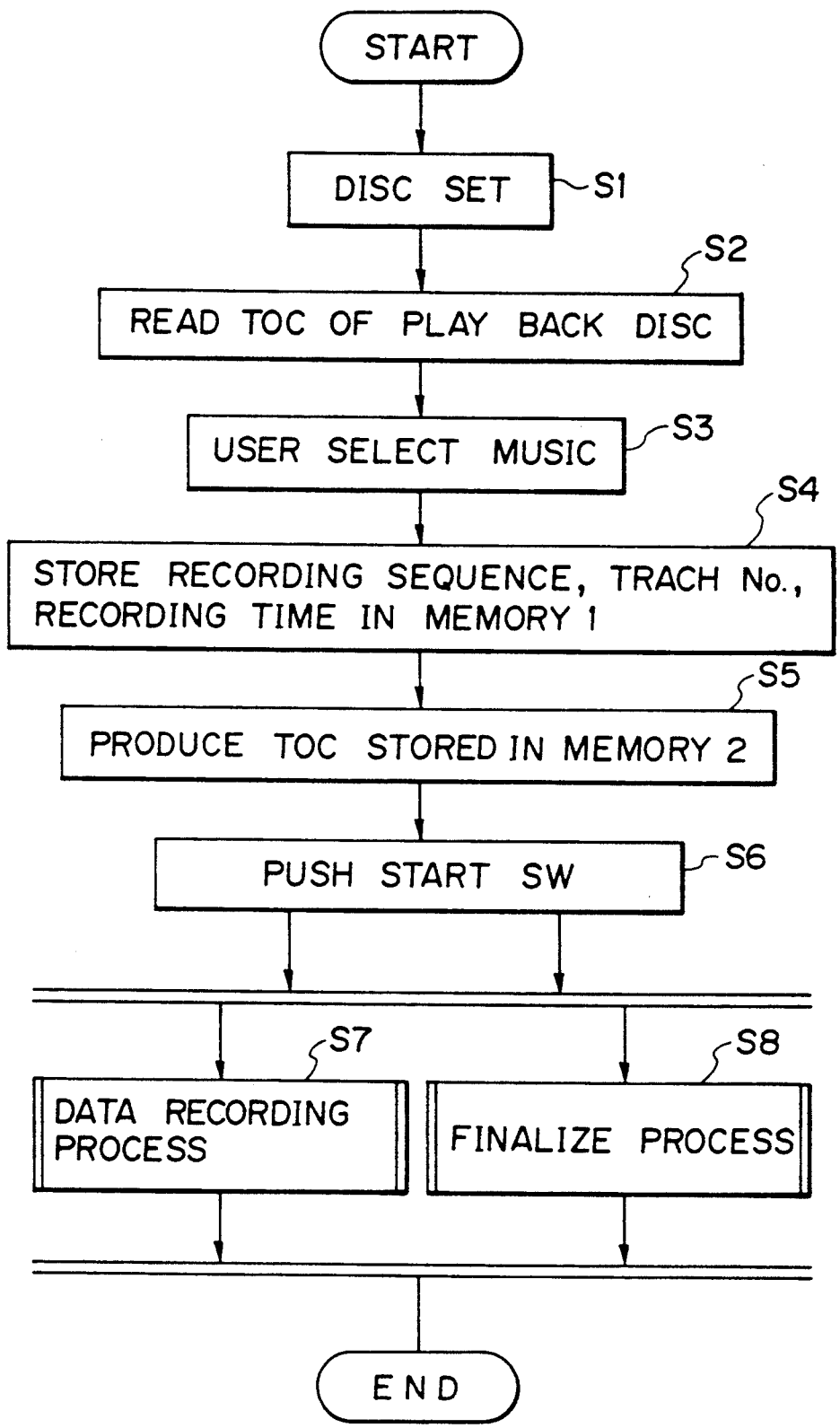
FIG. 3 is a flow chart showing an operation of the information recording apparatus.
Figure 4:
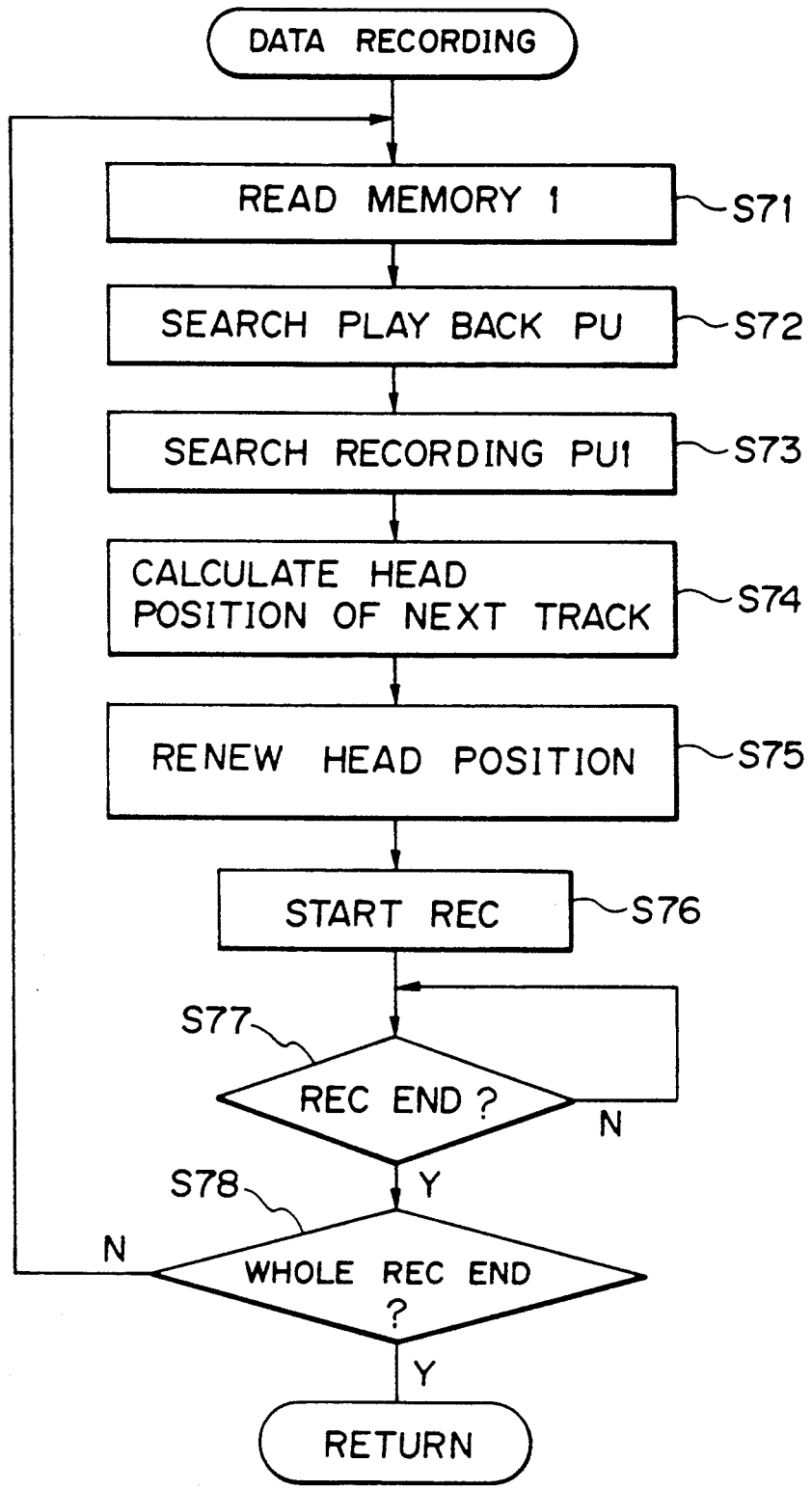
FIG. 4 is a flow chart showing an operation of the data recording process.

Next, the operation of the information recording apparatus 100 will be described below with reference to flow charts of FIGS. 3 to 5.

When an operator sets the CD 301 from which recording data is played back and the R-CD 201 to which recording data is to be recorded in step S1, the system controller 504 controls the playback block 300 to read out the TOC information from the CD 301 and to store them in the first memory 501 in step S2. When the operator selects music pieces to be played back in accordance with information displayed on the display 503 in step S3, the system controller 504 stores the recording sequence of the music pieces, the recording track numbers and the recording times of the music pieces recorded on the CD 301 to the first memory 501 in step S4. Subsequently, the system controller 504 produces the recording TOC information to be stored in the TOC information recording area of the R-CD 201 in accordance with the contents in the first memory 501, and stores the recording TOC information in the second memory 218 in step S5. When a start switch (not shown) is pushed in step 6, the system controller 504 in parallel performs following the data recording process in step S7 and the finalize process in step S8.

Data recording process (step S7)

When the recording control data shown in FIG. 2 is recorded in the recording sequence table in the first memory 501, the system controller 504 reads out the contents of the first memory 501 in step S71, and moves the playback pickup 303 to a position of a track on which the recording data is to be recorded in accordance with the recording control data read from the recording sequence table. Namely, the playback spindle motor 302 is rotated under the servo control of the playback spindle servo unit 307 in the playback block 300, and the playback pickup 303 is moved to the position of No. 5 track under the servo control of the playback focus tracking servo unit 304, and then the playback block 300 becomes pause state (step S72).

Subsequently, the first pick up 205 is moved to a recording position in step S73. The pregrooves on the R-CD 201 wobbles with a predetermined period. The wobbling frequency is decided to be 22.05 kHz, a half of the sampling frequency 44.1 kHz of the CD, so as not to affect a frame frequency and the recorded data. An absolute time in pregroove (ATIP) is superimposed on this wobbling frequency, and is recorded after frequency modulated (FM). The ATIP indicates the position of the track in the recordable tracks on the R-CD, and the value is monotonously increased from a start position (ATIP=0 min. 0 sec.) to an end position of the recordable tracks. Accordingly, the system controller 504 moves the first pick up 205 to a recording position of the R-CD 201 by referring to this ATIP. When no information has been recorded on the R-CD 201, the system controller 504 moves the first pick up 205 to the start position (i.e., ATIP=0 min. 0 sec.) of the recordable tracks under the servo control of the first focus tracking servo unit 208 in accordance with the ATIP read by the first pick up 205, and then the recording block becomes pause state.

Subsequently, the system controller 504 calculates a track head position of the first pickup 205 which corresponds to a recording start position for next data (i.e., music piece of the track No. 7) in step S74. After recording the data of recording sequence No. 1 in the recording sequence table, the next recording start position $ATIP_{NXT1}$ of the first pick up 205 is a position of 5 min. 20 sec. from the recording start position $ATIP_{is}$ (ATIP=0 min. 0 sec.), according to the calculation expressed as:

$$ATIP_{nxt1} = ATIP_{is} + 5 \text{ min. } 20 \text{ sec.} = 5 \text{ min. } 20 \text{ sec.}.$$

The $ATIP_{NXT1}$ represents the track head position. Next, the system controller 504 renews the next recording start position $ATIP_{NXT1}$ calculated by the step S4 and stores it in the second memory 218 in step S75.

When the playback block 300 and the recording block 200 thus become ready, the system controller 504 releases the pause state and starts recording in step S76. Thereby, the recording information is read out by the playback pick up 303, output from the reader unit 305 as recording data and then temporally stored in the first RAM 203 serving as a buffer. The first write control unit 204 reads the recording data stored in the first RAM 203 in accordance with the recording format of the R-CD 201 and sends them to the mixer 403 as a playback data.

The mixer 403 mixes the playback data output from the reader unit 305 with the digital voice data input from the microphone 401 and converted by the A/D converter 402, and outputs them to the audio playback unit 404 and the first write control unit 204 as the recording data. Accordingly, the playback music on which voice of the user is superimposed is output from the speaker 405.

The recording data fed to the recording block 200 is temporally stored in the first RAM 203, transferred through the first write control unit 204 and recorded on the program area of the R-CD 201 by the first pick up 205. The level of the laser beam output from the first pick up 205 is controlled by the first power control unit 207. Thereby, the recording data mixed with the input voice signal are recorded on the R-CD 201 as recording pits formed thereon. In addition, if necessary, the first write control unit 204 stores information used for address management of the informations thus recorded in a users table of contents (UTOC) which is a directory area for address management of a user's recording area.

Then, the system controller 504 discriminates whether the recording of the music piece is completed or not in step S77. If the recording of the music piece is completed, the system controller 504 discriminates whether the recording of all the music pieces is completed or not with reference to the recording sequence table in the first memory 501 in step S78. In the case where the recording sequence table has the contents as shown in FIG. 2, the steps S71 to S78 are repeated until the recording of a music piece of the recording sequence No. 5 (i.e., track No.=9, recording time=4 min. 15 sec.) is completed. If all the music pieces listed in the recording sequence table are recorded, the data recording process is terminated.

Finalize process routine (step S8).

During the execution of the data recording process routine of step S7, the system controller 504 in parallel executes the following finalize process of steps S81 to S82 shown in FIG. 5.

The system controller 504 searches a lead-in area and a lead-out area in step S81. Then, the system controller records the TOC information in the lead-in area in accordance with the recording TOC information stored in the second memory 218 and records the lead-out code in the lead-out area. Namely, the recording TOC information stored in the second memory 218 is copied to the lead-in area of the R-CD 201 as the TOC information. In addition, the system controller 504 calculates the total recording time of the recording data to be continuously recorded on the R-CD 201 by adding respective recording times of recording sequences No. 1–No. 5 in the recording sequence table, thereby determining the start position of the lead-out area. In the case of the example shown in FIG. 5, since the total recording time is 21 min. 40 sec., the lead-out area is formed after the area of 21 min. 40 sec. in accordance with the ATIP read by the second recording pick up 211.

According to the embodiment mentioned above, recording in the lead-in area and the lead-out area can be formed in parallel with the recording in the program area. Therefore, the total time required for the finalization of the R-CD can be reduced. For example, when the Karaoke recording apparatus is used for business activities and a customer hopes to buy the R-CD in which his singing voice is recorded with the music, he can get the R-CD in a short time.

In the embodiment mentioned above, only the CD is used as a recording medium in which recording data for Karaoke playing is recorded. However, it is apparent that a digital audio tape (DAT), a video tape or other recording media can be used for the same purpose. Further, the recording apparatus (recording block 200 and the system control unit 500) can be constructed as an individual apparatus.

The invention may be embodied in other specific forms without departing from the spirit and the scope thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus for receiving recording information and index information with respect to said recording information, and recording said recording information on a recordable disc medium, comprising:

memory means for storing said index information as first index information;

first recording means for recording said recording information on said disc recording medium in accordance with said first index information;

control means for producing second index information on the basis of said first information; and second recording means for recording said second index information on said disc recording medium in parallel with the recording by said first recording means.

2. An information recording apparatus according to claim 1, wherein said recordable disc medium comprises an R-CD.

3. An information recording apparatus according to claim 2, wherein said information pieces are recorded on a program area of the R-CD.

4. An information recording apparatus according to claim 2, wherein said second index information comprises at least TOC information and infromation with respect to lead-out code.

5. An information recording apparatus according to claim 4, wherein said TOC infromation is recorded on a lead-in area of the R-CD.

6. An information recording apparatus according to claim 1, further comprising index memory means for storing said second index formation.

7. An information recording apparatus according to claim 1, wherein said recording information comprises a plurality of information pieces and said first information comprises at least number information and time-length information of the respective information pieces.

8. An information recording apparatus according to claim 7, wherein said control means calculates recording position of a lead-out code on the basis of said time-length information of the information pieces.

* * * * *